(12) United States Patent
Chancey et al.

(10) Patent No.: US 6,706,993 B1
(45) Date of Patent: Mar. 16, 2004

(54) SMALL BORE PTWA THERMAL SPRAYGUN

(75) Inventors: John Edward Chancey, Grosse Pointe Farms, MI (US); Lawrence Edward Ellis, Dearborn Heights, MI (US); Larry G Gargol, Ann Arbor, MI (US); Srikanth C. Reddy, Westland, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/248,122

(22) Filed: Dec. 19, 2002

(51) Int. Cl.[7] .............................................. B23K 10/00
(52) U.S. Cl. ........................... 219/121.47; 219/121.48; 219/121.5; 219/76.16; 427/449
(58) Field of Search ....................... 219/121.47, 121.52, 219/121.48, 121.39, 121.45, 121.59, 75, 76.15, 76.16; 427/569, 446, 449

(56) References Cited

U.S. PATENT DOCUMENTS

| | | | |
|---|---|---|---|
| 2,982,845 A | | 5/1961 | Yenni et al. |
| 3,472,995 A | | 10/1969 | Browning et al. |
| 4,370,538 A | * | 1/1983 | Browning .............. 219/121.52 |
| 4,681,258 A | | 7/1987 | Jenkins et al. |
| 4,788,402 A | | 11/1988 | Browning |
| 4,896,017 A | * | 1/1990 | Koppel et al. .......... 219/121.52 |
| 5,080,056 A | | 1/1992 | Kramer et al. |
| 5,245,153 A | | 9/1993 | Singer et al. |
| 5,296,667 A | | 3/1994 | Marantz et al. |
| 5,334,235 A | | 8/1994 | Dorfman et al. |
| 5,364,663 A | | 11/1994 | McCune, Jr. et al. |
| 5,442,153 A | | 8/1995 | Marantz et al. |
| 5,808,270 A | | 9/1998 | Marantz et al. |
| 5,938,944 A | * | 8/1999 | Baughman et al. ...... 219/76.16 |
| 6,084,197 A | * | 7/2000 | Fusaro, Jr. .............. 219/121.47 |
| 6,161,889 A | | 12/2000 | Davis, Jr. et al. |
| 6,372,298 B1 | * | 4/2002 | Marantz et al. ............. 427/449 |
| 6,428,596 B1 | | 8/2002 | Urevich et al. |

* cited by examiner

Primary Examiner—Mark Paschall
(74) Attorney, Agent, or Firm—Damian Porcari; Brooks Kushman PC (57) ABSTRACT

The present invention provides a plasma transferred wire arc torch assembly that includes a monolithic block assembly that combines into a single component several features that have previously been separate components. The monolithic block of the present invention combines the functions of a wire guide, an air baffle, and a nozzle. Integration of this components allows for a reduction in size of the plasma transferred wire arc torch assembly thereby making it possible to coat smaller diameter bores with metal.

21 Claims, 6 Drawing Sheets

SMALL BORE PTWA THERMAL SPRAYGUN

BACKGROUND OF THE INVENTION

1. Field of the Invention

This invention relates generally to a thermal spray apparatus and method of thermally materials and, in particular, to a thermal spray apparatus with a spray gun capable of coating relatively small bores.

2. Background Art

A particularly useful high pressure plasma coating process is the Plasma Transferred Wire Arc ("PTWA") process. The PTWA process is capable of producing high quality metallic coatings for a variety of applications such as the coating of engine cylinder bores. In the PTWA process, a high pressure plasma is generated in a small region of space at the exit of a plasma torch. A continuously fed metallic wire impinges upon this region where the wire is melted and atomized by the plasma. High speed gas emerging from the plasma torch directs the molten metal towards the surface to be coated. PTWA systems are high pressure plasma systems.

Specifically, the PTWA thermal spray process melts a feedstock material, usually in the form of a metal wire or rod, by using a constricted plasma arc to melt the tip of the wire or rod, removing the molten material with a high-velocity jet of partially ionized gas issuing from a constricting orifice. The ionized gas is a plasma and hence the name of the process. Plasma arcs operate typically at temperatures of 18,000°–25,000° F. (10,000°–14,000° C.). A plasma arc is a gas which has been heated by an electric arc to at least a partially ionized condition, enabling it to conduct an electric current. A plasma exists in any electric arc, but the term plasma arc is associated with plasma generators which utilize a constricted arc. One of the features which distinguishes plasma arc devices from other types of arc generators is that, for a given electrical current and plasma gas flow rate, the arc voltage is significantly higher in the constricted arc device. In addition, a constricted arc device is one which causes all of the gas flow with its added energy to be directed through the constricted orifice resulting in very high exiting gas velocities, generally in the supersonic range. There are two modes of operation of constricted plasma torches—non-transferred mode and transferred mode. The non-transferred plasma torch has a cathode and an anode in the form of a nozzle. In general, practical considerations make it desirable to keep the plasma arc within the nozzle with the arc terminating on the inner nozzle wall. However, under certain operating conditions, it is possible to cause the arc to extend outside the nozzle bore and then fold back, establishing a terminal point for the arc on the outside face of the anode constricting nozzle. In the transferred arc mode, the plasma arc column extends from the cathode through a constricting nozzle. The plasma arc extends out of the torch and is terminated on a workpiece anode which is electrically spaced and isolated from the plasma torch assembly.

In the plasma transferred wire arc thermal spray process, the plasma arc is constricted by passing it through an orifice downstream of the cathode electrode. As plasma gas passes through the arc, it is heated to a very high temperature, expands and is accelerated as it passes through the constricting orifice often achieving supersonic velocity on exiting the orifice, towards the tip of the wire feedstock. Typically, the different plasma gases used for the plasma transferred wire arc thermal spray process are air, nitrogen, or an admixture of argon and hydrogen. The intensity and velocity of the plasma is determined by several variables including the type of gas, its pressure, the flow pattern, the electric current, the size and shape of the orifice and the distance from the cathode to the wire feedstock.

The prior art plasma transferred wire arc processes operate on direct current from a constant current type power supply. A cathode electrode is connected to the negative terminal of a power supply through a high frequency generator which is employed to initiate an electrical arc between the cathode and a constricting nozzle. The high frequency arc initiating circuit is completed by the momentary closure of a pilot arc relay contact allowing direct current to flow from the positive terminal of power supply through a pilot resistor to the constricting nozzle, through the high frequency arc formed between the cathode and the constricting nozzle, through the high frequency generator to the negative terminal of the power supply. The high frequency circuit is completed through the bypass capacitor. This action heats the plasma gas which flows through the orifice. The orifice directs the heated plasma stream from the cathode electrode towards the tip of the wire feedstock which is connected to the positive terminal of the power supply. The plasma arc attaches to or "transfers" to the wire tip and is thus referred to as a transferred arc. The wire feedstock is advanced forward by means of the wire feed rolls, which are driven by a motor. When the arc melts the tip of the wire, the high-velocity plasma jet impinges on the wire tip and carries away the molten metal, simultaneously atomizing the melted metal into fine particles and accelerating the thus formed molten particles to form a high-velocity spray stream entraining the fine molten particles.

In order to initiate the transferred plasma arc a pilot arc must be established. A pilot arc is an arc between the cathode electrode and the constricting nozzle. This arc is sometimes referred to as a non-transferred arc because it does not transfer or attach to the wire feedstock as compared to the transferred arc which does. A pilot arc provides an electrically conductive path between the cathode electrode within the plasma transferred wire arc torch and the tip of the wire feedstock so that the main plasma transferred arc current can be initiated. The most common technique for starting the pilot arc is to strike a high frequency or a high voltage direct voltage (DC) spark between the cathode electrode and the constricting nozzle. A pilot arc is established across the resulting ionized path generating a plasma plume. When the plasma plume of the pilot arc touches the wire tip, an electrically conductive path from the cathode electrode to the anode wire tip is established. The constricted transferred plasma arc will follow this path to the wire tip.

U.S. Pat. No. 5,808,270 addresses a number of problems in the prior arc related to plasma torch operation. U.S. Pat. No. 5,808,270 is hereby incorporated by reference. Such problems include double arcing, electrical shorting due to metallic dust being attracted to the cathode, and the buildup of coating material on the outer surface of the torch which faces the surface being coated. Furthermore, problems associated with the starting of spraying often cause a "spit" or large molten globule to be formed and propelled to the substrate. This globule may cause an imperfection by being included into the coating as the coating builds up on the substrate. However, because of the complexity and the number of individual components of the plasma torch of U.S. Pat. No. 5,808,270, this torch is somewhat limited by how small a bore may be coated. Accordingly, there exists a need for an improved plasma spray torch that can coat smaller diameter bores.

SUMMARY OF INVENTION

The present invention overcomes the problems encountered in the prior art by providing a plasma transferred wire arc torch assembly that includes a monolithic block assembly combining into a single component several features that have previously been separate components. The monolithic block of the present invention combines the functions of a wire guide, an air baffle and a nozzle. Integration of this components into one component allows for a reduction in size of the plasma transferred wire arc torch assembly. Accordingly, the plasma transferred wire arc torch assembly of the present invention is able to coat the inside of smaller diameter bores than the assemblies of the prior art specifically, the assembly of the present invention is able to coat bores of diameter equal to or greater than about 1.3 inches. Furthermore, the monolithic block assembly of the present invention is simple to fabricate thereby resulting in a reduction in the cost of fabricating a plasma transferred wire arc torch assembly.

In another embodiment of the present invention, a method of coating a surface with a metallic coating utilizing the plasma transferred wire arc torch assembly and the monolithic block assembly of the present invention is provided. The method of the invention comprises initiating and sustaining a plasma in a plasma gun which incorporates the plasma transferred wire arc torch assembly and the monolithic block assembly of the present invention.

DETAILED DESCRIPTION

Reference will now be made in detail to presently preferred compositions or embodiments and methods of the invention, which constitute the best modes of practicing the invention presently known to the inventors.

In one embodiment of the present invention, an improved PTWA spray gun is proved. The spray gun of the present invention is a component in a plasma transferred wire arc thermal spray apparatus that may be used to coat a surface with a dense metallic coating. The spray gun of the present invention includes a monolithic block assembly that has a wire feed guide section for introducing wire feedstock into a plasma torch, an air baffle section for introducing a secondary gas around the plasma formed by the plasma torch, and a nozzle section for confining a plasma formed by the plasma torch. Furthermore, the monolithic block assembly is made from a single piece of metal such that heat is removed from the thermal spray apparatus during operation.

Figure 1:
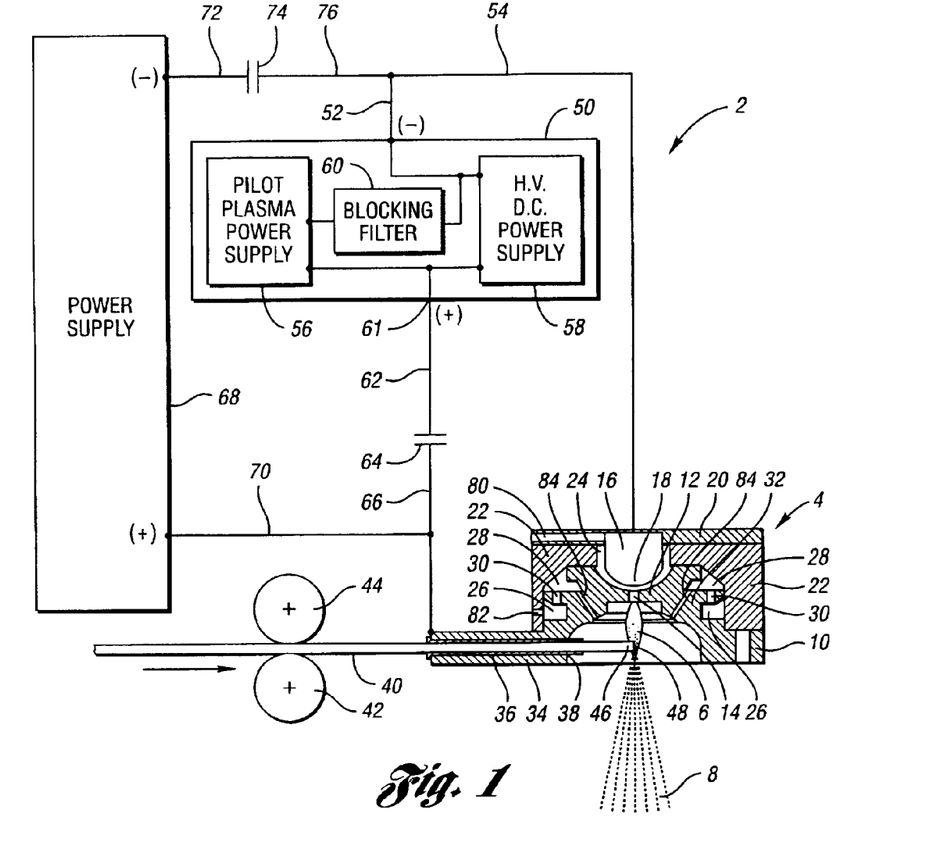
FIG. 1 is a schematic of a preferred embodiment of the present invention showing the integration of the monolithic block assembly in a plasma spray torch.

With reference to FIG. 1, a preferred embodiment of the present invention is shown in schematic form. Plasma transferred wire arc thermal spray apparatus 2 is shown to include plasma torch gun 4. During operation as set forth below, extended plasma arc 6 and metal spray 8 emerge from plasma torch gun 4. Monolithic block assembly 10 includes constricting nozzle section 12 which has a cup-shaped form with a constricting orifice 14 located at the center of the cup-shaped form. Preferably, monolithic block assembly 10 is made of a conductive material such as copper. Cathode electrode 16, which may be constructed from 2% thoriated tungsten, is located coaxial with the constricting nozzle section 12 and has cathode free end 18. Cathode electrode 16 is attached to cathode plate 20 which is preferably made from a metal such as brass. Cathode plate 20 is electrically insulated from constricting nozzle section 12 by insulating body 22, forming an annular plasma gas chamber 24 internally between the cathode electrode 16 and the inner walls of the constricting nozzle section 12 and insulating body 22. In addition, a separate chamber 26 is formed within the outer section of the monolithic block assembly 10. Chamber 26 is in turn connected to chamber 28 by a plurality of bores 30 formed within the monolithic block assembly 10 at air baffle section 32. Wire guide section 34 is connected to constricting nozzle section 12 and formed within monolithic block assembly 10. Wire feed guide 36 is contained within bore 38 of wire guide section 34. Wire feedstock 40 is constantly fed by means of wire feed rolls 42 and 44 through wire feed guide 36. Wire feed rolls are driven by means of a conventional motor (not shown). Free wire end 46 emerges from wire feed guide 36 and contacts extended plasma 6 at position 48 located opposite to constricting orifice 14 to form metal spray 8. In operation, metal spray 8 is directed towards a substrate to be coated. The present invention advantageously combines constricting nozzle section 12, air baffle section 32, and wire guide section 34 into one component made from a single piece of metal.

Still referring to FIG. 1 the electrical circuitry that is associated with the operation of the plasma transferred wire arc thermal spray apparatus 2 consists of a pilot power supply assembly 50, the negative terminal of which is connected through electrical leads 52 and 54 to the cathode electrode 16. The pilot power supply assembly consists of a direct current (DC) constant current pilot power supply 56 and a high voltage DC power supply 58 which is in an electrically parallel connection across the pilot power supply. A suitable pilot power supply assembly is Model "PowerPro 55" available from Smith Equipment Division of TESCOM Corp. A high voltage DC blocking filter 60 is located in the negative leg of the high voltage power supply 58 which prevents any high voltage from feeding back into the pilot power supply 56. Positive terminal 61 of pilot power supply assembly 50 is connected through lead 62 to a pilot relay contact 64 which is connected through lead 66 to the wire contact tip or feedstock free end and wire guide section 34 which is in electrical contact with the constricting nozzle 12. A separate main plasma transferred wire arc power supply 68 is also employed, the positive terminal being connected by means of lead 70 to the lead 66 which in turn is connected to the wire guide section 34 and by means of electrical contact connected to the constricting nozzle as well as the wire feedstock 40. The negative terminal of power supply 68 is connected through lead 72 to the contacts of an isolation contactor 74 through lead 76 and lead 54 to the cathode electrode 16. A suitable main power supply is Model PCM-100 available from ESAB Welding and Cutting Products.

In operation, plasma gas enters through port 80 into the internal chamber 24 formed by constricting nozzle section 12 and insulating body 22. The plasma gases flow into chamber 24 and form a vortex flow being forced out of the constricting orifice 14. A suitable plasma gas is a gas mixture consisting of 65% argon and 35% hydrogen. Other gases have also been used, such as nitrogen. In order to start the operation of the plasma transferred wire arc process, it is necessary to initiate a pilot plasma. To initiate a pilot plasma, the pilot plasma power supply 56 is activated and the positive terminal is connected through the pilot relay contactor 64 to the constricting nozzle section 12 and the negative terminal is connected to the cathode electrode 16. Simultaneously, the high voltage power supply 58 is pulsed "on" for sufficient time to strike a high voltage arc between the cathode electrode 16 and the constricting nozzle section 12. The high voltage arc thus formed provides a conductive path for the DC current from the pilot plasma power supply to flow from the cathode electrode 16 to the constricting nozzle section 12. As a result of this added electrical energy, the plasma gas is intensely heated which causes the gas, which is in a vortex flow regime, to exit the constricting orifice at very high velocity, generally forming a supersonic plasma jet extending from the constricting orifice. The plasma arc thus formed is an extended plasma arc which initially extends from the cathode through the core of the vortex flowing plasma jet to the maximum extension point and the "hairpins" back to the face of the constricting nozzle. The high velocity plasma jet, extending beyond the maximum arc extension point provides an electrically conductive path between the cathode electrode 16 and free end 46 of the wire feedstock 40. As soon as the pilot plasma is established, the isolation contactor 74 is closed, adding additional power to the pilot plasma. A plasma is formed first between cathode 16 and nozzle section 12 which subsequently transfers to wire feedstock 40 causing the wire tip to melt as it is being continuously fed into the plasma jet. A secondary gas entering through port 82, such as air, is introduced under high pressure into chamber 26. Chamber 26 acts as a plenum to distribute this secondary gas to the series of spaced bores 30. The secondary gas then flows into chamber 28 and then through a plurality of angularly spaced bores 84. The flow of this secondary gas provides a means of cooling wire guide section 34, constricting nozzle section 12, and air baffle section 32, as well as providing an essentially conically shaped flow of gas surrounding extended plasma arc 6. This conically shaped flow of high velocity gas intersects with the extended plasma jet downstream of the tip (free end 46) of wire feedstock 40, thus providing addition means of atomizing and accelerating the molten particles formed by the melting of wire feedstock 40.

Figure 2:
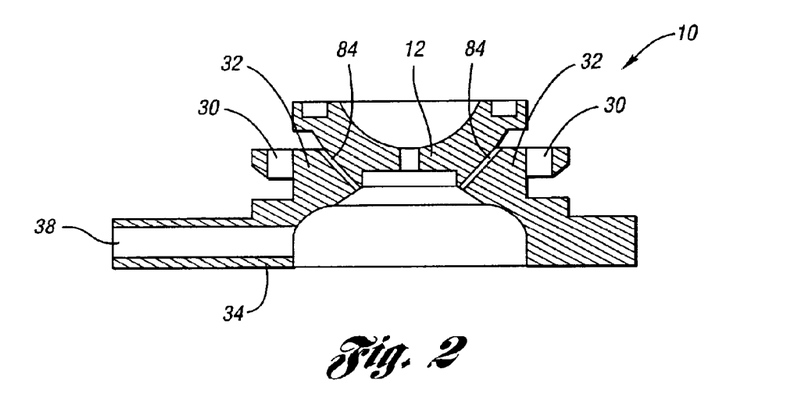
FIG. 2 is a cross-section of the monolithic block assembly of the present invention.
Figure 3A:
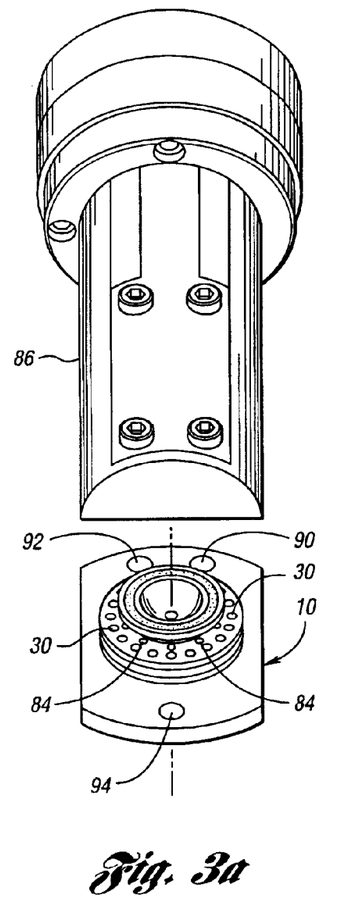
FIG. 3a is a perspective view of the plasma gun of the present invention as viewed from the side with the back plate.
Figure 3B:
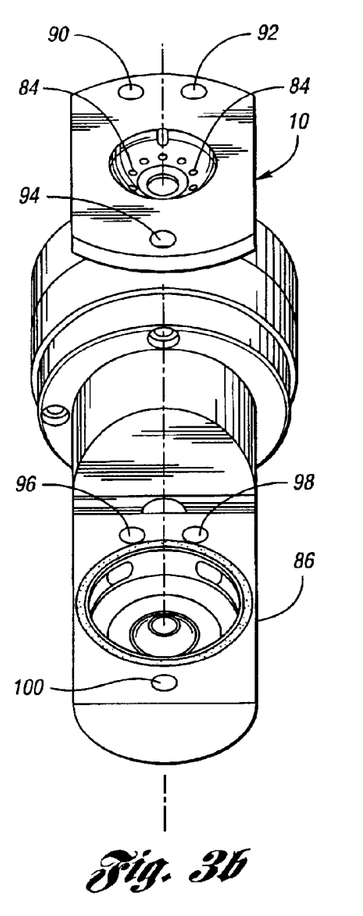
FIG. 3b is a perspective view of the plasma gun of the present invention as viewed from the side with the monolithic block assembly of the present invention.

Reference is made to FIG. 2, which is a cross-section of the monolithic block assembly, and to FIGS. 3a and 3b which are, respectively, a top and bottom exploded view illustrating the placement of the monolithic block assembly in the plasma gun. Monolithic block assembly 10 is bolted to plasma gun 86 through bolt holes 90, 92, 94 and threaded receiving holes 96, 98, 100. Monolithic block assembly 10 integrates wire guide section 34, air baffle section 32, and nozzle section 12 into a monolithic block of metal. Nozzle section 12 defines constricting orifice 14 through which the plasma emerges. Air baffle section 32 includes a series of annularly spaced bores 84. Angularly spaced bores 84 direct the flow of the secondary gas such that the plasma is shaped by the flow action of this secondary gas. Wire guide section 34 provides support for wire guide 36 through which wire feedstock is directed. Furthermore, wire guide section 34 functions as a heat sink that cools the feedstock as it is introduced in the plasma.

Figure 4:
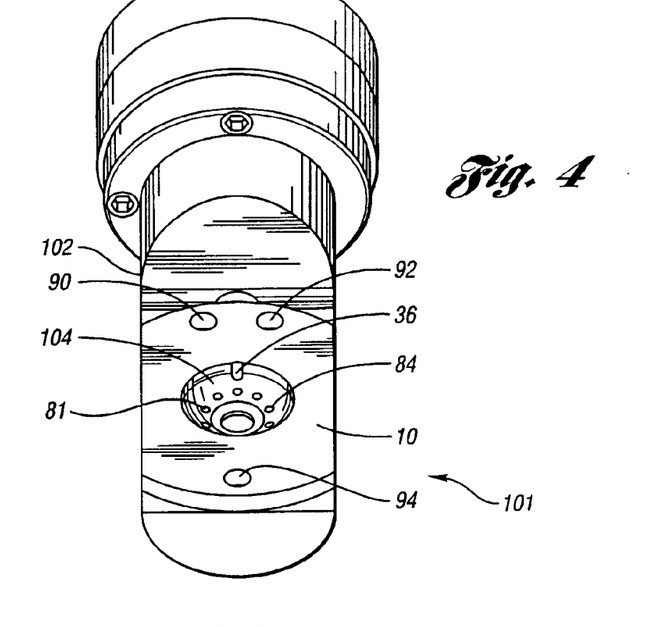
FIG. 4 is a perspective view of the assembled plasma gun of the present invention.
Figure 5:
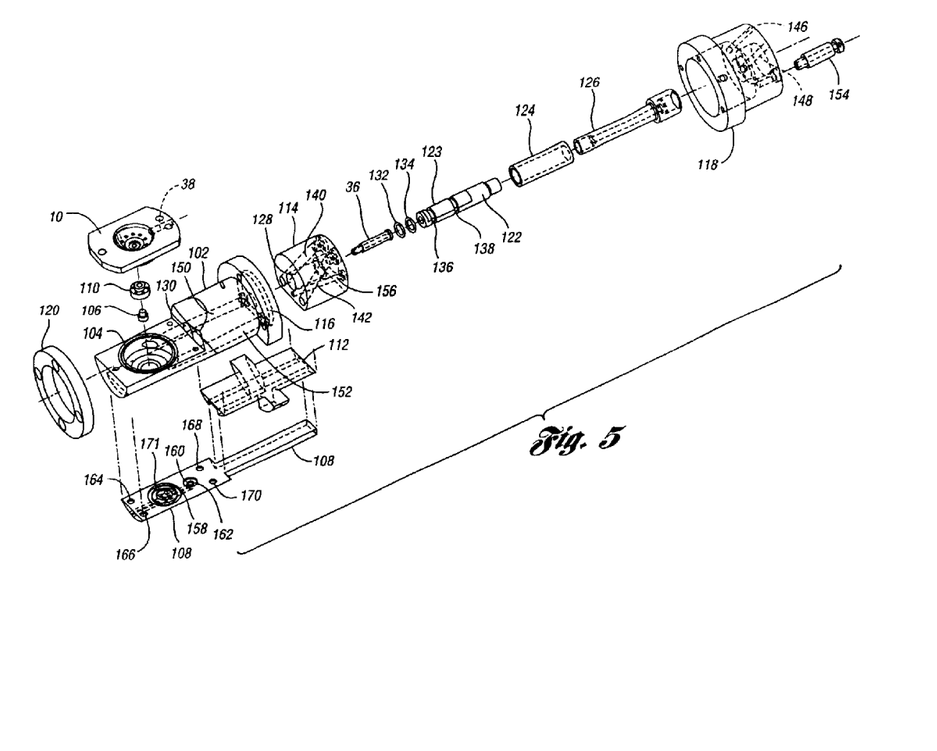
FIG. 5 is an exploded view of the plasma gun including the monolithic block assembly of the present invention.
Figure 6:
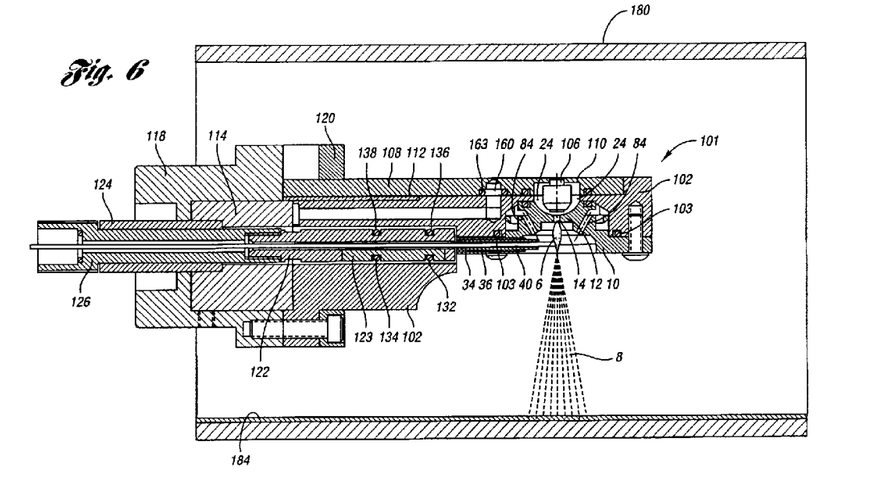
FIG. 6 is a longitudinal cross-section of a bore to be coated with a metallic coating with the plasma gun of the present invention.

The assembly of the plasma gun of the present invention is illustrated by reference to FIGS. 4, 5, and 6. FIG. 4 is a perspective view of the assembled plasma gun 101, while FIG. 5 is an exploded view of the plasma gun including the monolithic block assembly. FIG. 6 is a longitudinal cross-section of a bore to be coated with a metallic coating with the plasma gun of the present invention. Monolithic block assembly 10 is bolted to plasma gun body 102 with bolt hole 90, 92, 94. A seal is made to plasma gun body 102 with by O-ring 103 placed in groove 104. Wire guide 36 extends slightly out of monolithic block assembly 10. Cathode 106 is attached to brass back plate 108 with nozzle nut 110. Insulating plate 112 is attached to plasma gun body 102 and is held in place by bolting brass back plate 108 to plasma gun body 102. Plasma gun body 102 is preferably made from an insulting material with a high dielectric strength. Torlon is a suitable material for plasma gun body 102. Spacer block 114 contacts plasma gun body 102 at indentation 116. Spacer block 114 is also made from an insulting material such as torlon. Furthermore, spacer block also fits into rear body 118 which is held against plasma gun body 102 by retaining ring 120 which is bolted onto rear body 118. Preferably, rear body 118 is made from a conductive material such as brass. Wire guide 36 telescopes through bore 38. Upper contact electrode 122 and lower contact electrode 123 are joined and held together by O-rings 132 and 134 to form a tube-like structure. Accordingly, wire feedstock 40 make electrical contact with either contact electrode 122 and lower contact electrode 123. Insulating tube 124 slides over metal tube 126. Insulating tube 124 is made from an insulating material such as glassed filled Teflon. Metal tube 126 screws into upper contact electrode 122. Collectively, metal tube 126, upper contactor 122, lower contactor 123, and wire guide 36 form a conduit for wire feed stop to be fed into the plasma torch. This conduit goes through cavity 128 in spacer block 114 and opening 130 in plasma gun body 102 where it proceeds to extend through bore 38 in monolithic assembly 10. O-rings 132, 134 sit in grooves 136, 138 and provide a seal with an internal cavity (not shown) in plasma gun body 102. Rear body 118 has channels 146, 148 that allow introduction of the secondary gas into the plasma torch. Channels 146, 148 line up with and fed into channels 140, 142 in spacer block 114. Channels 140, 142 in turn fed into channels 150, 152 which introduce the secondary gases to monolithic block assembly 10. Gas inlet tube 154 slips into rear body 118. Plasma gas is introduced into gas tube inlet 154 flows through channel 156. The gas proceeds through a channel (not shown) in plasma gun body 102 and into channel 158 in back plate 108 through opening 160. A seal with plasma gun body 102 is made with an O-ring placed in groove 162. The plasma gas then flows into the chamber created by the attachment of monolithic block assembly 10 and back plate 108 to plasma gun body 102. Back plate 108 is bolted to plasma gun body 102 through bolt holes 164, 166, 168, 170. A seal is made to plasma gun body 102 with an O-ring placed into O-ring groove 171.

Figure 7:
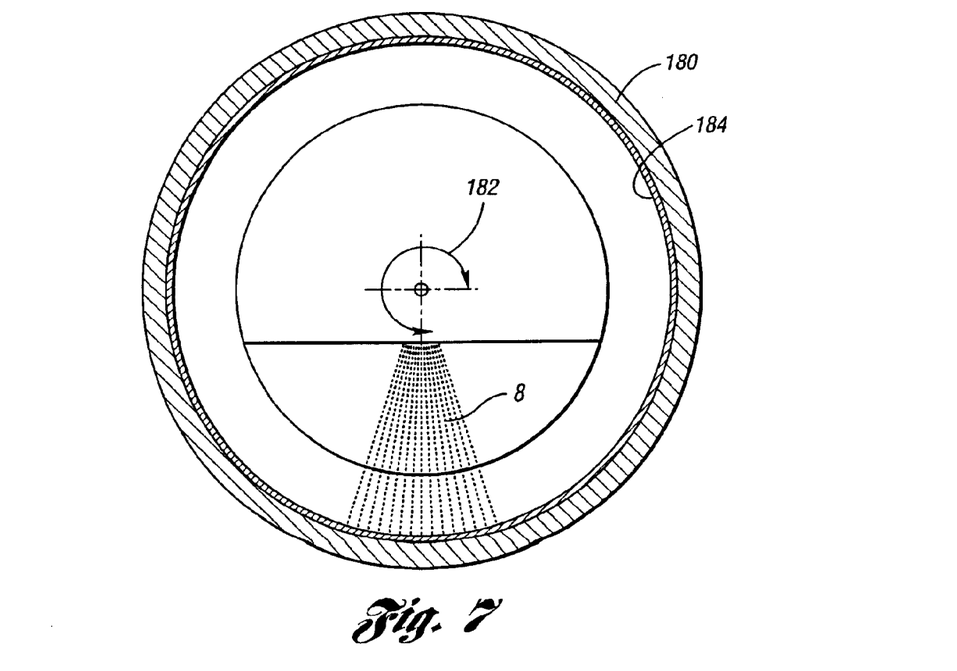
FIG. 7 is a transverse cross-section of a bore to be coated with a metallic coating with the plasma gun of the present invention.

The operation of the plasma torch assembly of the present invention in coating the interior surface of a bore with a metallic coating is best understood by reference to FIGS. 5, 6 and 7. Plasma gas introduced into plasma gun 101 through gas inlet tube 154 flow through rear body 118, spacer block 114, and plasma gun body 102 into channel 158 of back plate 108. The plasma gas next proceeds into annular plasma gas chamber 24 where the high gas pressure and flow create a vortex flow. The plasma gas then emerge from restricting orifice 14. When a plasma is initiated as set forth above, extended plasma arc 6 extends out of restricting orifice 14. Wire feedstock 40 is continually fed into extended into extended plasma 6 where wire feedstock 40 is melted and atomized into metal spray 8. FIG. 6 is a longitudinal cross-section of bore 180 and the plasma transferred wire arc torch assembly illustrating metal spray 8 being sprayed onto the inner surface of bore 180. Bore 180 may be the cylinder bores of an internal combustion engine. FIG. 7 is a transverse cross section through bore 180 illustrating the rotation of plasma transferred wire arc torch assembly within bore 180 about an axis through wire feedstock 40 to coat the interior of bore 180 with metal coating 184. Plasma transferred wire arc torch assembly may be moved along the length of bore 180 and rotated in direction 182 about an axis through wire feedstock 40. Both of these movements of plasma transferred wire arc torch assembly allows for a substantial area of the interior surface of bore 180 to be coated with a metallic coating.

Figure 8:
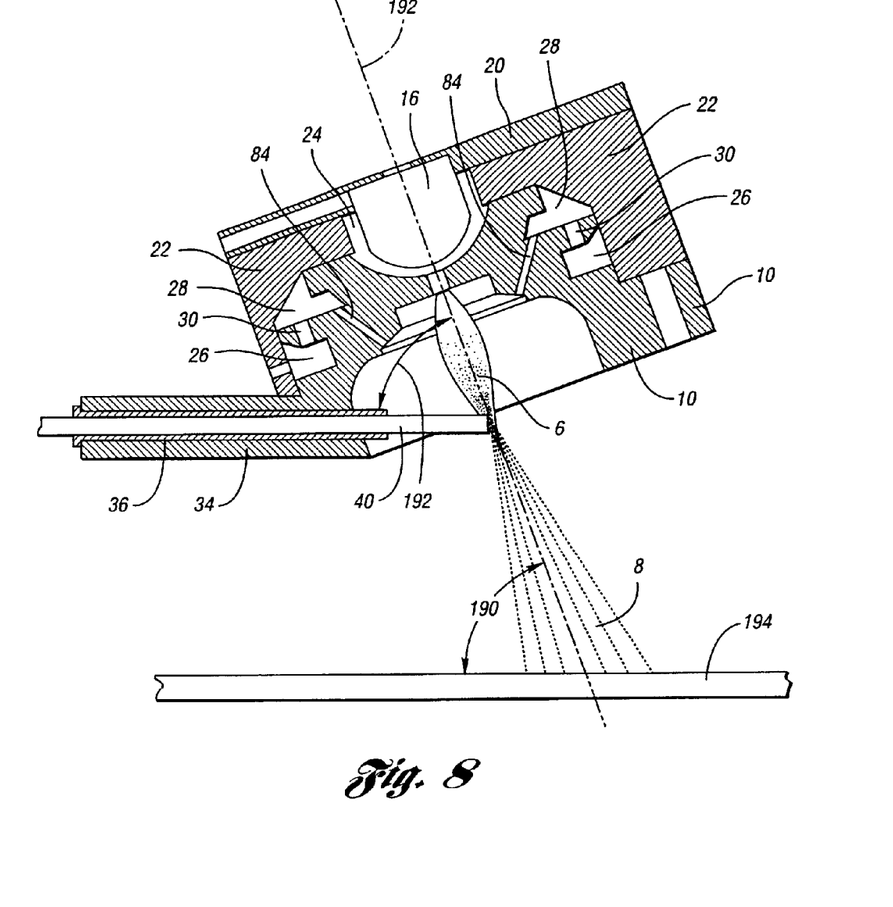
FIG. 8 is a schematic of a variation of the plasma gun of the present invention in which a plasma emerges at an acute angle relative to a substrate to be coated.

A variation of the plasma transferred wire arc torch assembly of the present invention is provided by reference to FIG. 8. This embodiment allows for extended plasma arc 6 and metal spray 8 to be directed at an angle 190 relative to an axis through feedstock 40, i.e., the included angle between direction 192 of extended plasma arc 6 and surface 194 of the object to be coated. Preferably, this included angle is less than 90 degrees. Angling extended plasma 6 in such a manner minimizes particle buildups on the plasma torch. In this embodiment, the shape of monolithic block assembly 10 has been altered to allow the feedstock 40 to be fed at an angle to extended plasma arc 6.

In another embodiment of the present invention, a method of coating a surface with a dense metallic coating using a plasma transferred wire arc thermal spray apparatus is provided. The method of the present invention utilizes the plasma spray torch integrated with the monolithic block assembly as described above. As set forth above, the plasma transferred wire arc torch assembly comprises:

a cathode having a free end and biased at a first negative electrical potential;

a monolithic block assembly that includes a wire feed guide section, an air baffle section, and a nozzle section;

a source of plasma gas directing plasma gas into the nozzle surrounding the cathode and exiting the restricted nozzle orifice; and a wire feed continuously directing a free end of wire feedstock opposite the restricted nozzle orifice and the wire feedstock having the same second positive electrical potential as the nozzle, wherein nozzle section is biased at a second positive electrical potential and generally surrounding the free end of the cathode in spaced relation wherein the nozzle has a restricted orifice opposite the free end of the nozzle section and the thermal spray apparatus establishes a plasma transferred arc between the wire feedstock free end and the cathode melting the wire feedstock free end and the plasma gas exiting the restricted nozzle orifice atomizing melted feedstock and propelling atomized melted wire feedstock toward the surface, thereby coating the surface.

Accordingly, the method of the present invention comprises:

a) directing a plasma gas into the nozzle surrounding the cathode and exiting the restricted nozzle orifice;

b) initiating an electrical pilot arc between the cathode and the nozzle by creating an electrical potential differential there between, wherein the cathode has a negative electrical potential and nozzle has a positive electrical potential;

c) extending the electric arc through the restricted nozzle orifice by increasing electrical energy to the electric arc and forming a constricted extended plasma arc; and d) transferring the constricted extended plasma arc from the nozzle to the free end of the wire feedstock by creating an electrical potential differential between the wire feedstock free end and the cathode, wherein the wire feedstock and the nozzle have the same positive electrical potential and the cathode has a negative electrical potential, thereby melting the wire feedstock free end, the plasma gas atomizing molten feedstock and propelling atomized molten feedstock onto the surface and forming the dense metal coating on the surface. In general, a plasma gas under pressure will be introduced tangentially into the nozzle and creating a vortex flow around the cathode and exiting the restricted nozzle orifice. Furthermore, the method optionally includes directing a second gas stream towards the wire feedstock free end in the form of an annular conical gas stream surrounding the wire feedstock free end and having a point of intersection spaced downstream of the wire feedstock free end.

When an interior concave surface such as a cylinder bore of a piston engine is to be coated, the method will include rotating and translating the nozzle and the cathode as an assembly about a longitudinal axis of the wire feedstock while maintaining an electrical connection and the same electrical potential between the nozzle and the wire feedstock, thereby directing the atomized molten feedstock rotationally and coating an internal arcuate surface with the dense metal Moreover, the assembly and method of the present invention are able to coat bores of diameter equal to or greater than about 1.3 inches. More preferably, the torch assembly of the present invention is useful in coating bore with a diameter from about 1.3 inches to about 4.0 inches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A plasma transferred wire arc thermal spray apparatus for applying a coating to a surface, the thermal spray apparatus comprising:

a monolithic block assembly that includes a wire feed guide section for introducing wire feedstock into a plasma torch;

an air baffle section for introducing a secondary gas around the plasma formed by the plasma torch; and a nozzle section for confining a plasma formed by the plasma torch;

wherein the monolithic block assembly is made from a single piece of metal such that heat is removed from the thermal spray apparatus during operation.

2. The plasma transferred wire arc thermal spray apparatus of claim 1 further comprising:

a cathode having a free end and biased at a first negative electrical potential;

a monolithic block assembly that includes a wire feed guide section, an air baffle section, and a nozzle section;

a source of plasma gas directing plasma gas into the nozzle surrounding the cathode and exiting the restricted nozzle orifice; and a wire feed continuously directing a free end of wire feedstock opposite the restricted nozzle orifice and the wire feedstock having the same second positive electrical potential as the nozzle;

wherein nozzle section is biased at a second positive electrical potential and generally surrounding the free end of the cathode in spaced relation wherein the nozzle has a restricted orifice opposite the free end of the nozzle section and the thermal spray apparatus establishes a plasma transferred arc between the wire feedstock free end and the cathode melting the wire feedstock free end and the plasma gas exiting the restricted nozzle orifice atomizing melted feedstock and propelling atomized melted wire feedstock toward the surface, thereby coating the surface.

3. The plasma transferred wire arc thermal spray apparatus of claim 2, wherein the cathode and the nozzle are rotatably mounted as an assembly about a longitudinal axis of the wire feedstock while maintaining the same second positive electrical potential of the nozzle and the wire feedstock, the cathode and nozzle assembly rotatable about the wire feedstock to direct the plasma transferred arc rotatably through the longitudinal axis of the wire feedstock to coat an interior arcuate surface opposite the restricted orifice of the nozzle.

4. The plasma transferred wire arc thermal spray apparatus of claim 2, wherein the nozzle includes an enclose annular chamber surrounding the cathode in spaced relation and an inlet port spaced from the restricted nozzle orifice defined at an angle relative to the axis of the annular chamber, the plasma gas directed into the enclosed annular nozzle chamber under pressure to create a vortex plasma gas flow around the cathode and exiting the restricted nozzle orifice.

5. The plasma transferred wire arc thermal spray apparatus of claim 4, wherein the angle between the longitudinal axis of the wire feedstock and the plasma transferred arc is less than 90 degrees.

6. The plasma transferred wire arc thermal spray apparatus of claim 4, wherein the wire feed includes a generally tubular electrically conductive wire guide through which the wire feedstock is fed to the nozzle restricted orifice in contact with the wire guide, and the wire guide in continuous electrical contact with the nozzle as the cathode and nozzle assembly is rotated about the longitudinal axis of the wire feedstock.

7. The plasma transferred wire arc thermal spray apparatus of claim 2, wherein the apparatus includes:

a high voltage direct current power source having a negative terminal operably connected to the cathode to establish a negative electrical potential of the cathode and a positive terminal operatively connected to the nozzle to establish a positive electrical potential of the nozzle, thereby initiating an electric arc between the cathode and the nozzle;

a pilot plasma direct current power supply having a negative terminal connected to the cathode and a positive terminal connected to the nozzle to increase the energy state of the electric arc, thereby extending the electric arc through the restricted nozzle orifice and forming a constricted plasma arc; and a separate main direct current power supply having a negative terminal connected to the cathode and a positive terminal operatively connected to the wire feedstock to increase the energy state of the constricted plasma arc, the wire feedstock and the nozzle electrically connected to maintain the same second positive electrical potential in the nozzle and the wire feedstock, thereby extending the constricted plasma arc to the wire feedstock and establishing the plasma transferred arc between the wire feedstock and the cathode.

8. The plasma transferred wire arc thermal spray apparatus of claim 2, wherein the apparatus includes a second gas source and the nozzle includes a generally annular conical gas port surrounding the restricted nozzle orifice connected to the second gas source, the port directing the send gas to a point downstream from the wire feedstock.

9. The plasma transferred wire arc thermal spray apparatus of claim 8, wherein the nozzle includes a plurality of spaced converging gas ports surrounding the restricted nozzle orifice generating a conical gas stream of the second gas surrounding the plasma transferred arc.

10. The plasma transferred wire arc thermal spray apparatus of claim 9, wherein the wire feed includes a generally tubular wire guide through which the wire feedstock is fed to the nozzle restricted orifice, and the apparatus including a gas port opening around the wire guide and cooling the wire guide and the wire feedstock.

11. The plasma transferred wire arc thermal spray apparatus of claim 2, wherein the included angle defined between the plasma transferred arc and the surface is less than 90 degrees.

12. The plasma transferred wire arc thermal spray apparatus of claim 1 wherein the monolithic block assembly is made from a metal.

13. The plasma transferred wire arc thermal spray apparatus of claim 1 wherein the monolithic block assembly is made from copper.

14. A method of coating a surface with a dense metallic coating using a plasma transferred wire arc thermal spray apparatus, the apparatus including:

a cathode having a free end and biased at a first negative electrical potential;

a monolithic block assembly that includes a wire feed guide section, an air baffle section, and a nozzle section;

a source of plasma gas directing plasma gas into the nozzle surrounding the cathode and exiting the restricted nozzle orifice; and a wire feed continuously directing a free end of wire feedstock opposite the restricted nozzle orifice and the wire feedstock having the same second positive electrical potential as the nozzle;

wherein nozzle section is biased at a second positive electrical potential and generally surrounding the free end of the cathode in spaced relation wherein the nozzle has a restricted orifice opposite the free end of the nozzle section and the thermal spray apparatus establishes a plasma transferred arc between the wire feedstock free end and the cathode melting the wire feedstock free end and the plasma gas exiting the restricted nozzle orifice atomizing melted feedstock and propelling atomized melted wire feedstock toward the surface, thereby coating the surface, the method comprising:

a) directing a plasma gas into the nozzle surrounding the cathode and exiting the restricted nozzle orifice;

b) initiating an electrical pilot arc between the cathode and the nozzle by creating an electrical potential differential therebetween, wherein the cathode has a negative electrical potential and the nozzle has a positive electrical potential;

c) extending the electric arc through the restricted nozzle orifice by increasing electrical energy to the electric arc and forming a constricted extended plasma arc; and d) transferring the constricted extended plasma arc from the nozzle to the free end of the wire feedstock by creating an electrical potential differential between the wire feedstock free end and the cathode, wherein the wire feedstock and the nozzle have the same positive electrical potential and the cathode has a negative electrical potential, thereby melting the wire feedstock free end, the plasma gas atomizing molten feedstock and propelling atomized molten feedstock onto the surface and forming the dense metal coating on the surface.

15. The method of coating a surface with a dense metallic coating of claim 14, wherein the method includes rotating the nozzle and the cathode as an assembly about a longitudinal axis of the wire feedstock while maintaining an electrical connection and the same electrical potential between the nozzle and the wire feedstock, thereby directing the atomized molten feedstock rotationally and coating an internal arcuate surface with the dense metal coating.

16. The method of claim 14, wherein the method includes directing a plasma gas under pressure tangentially into the nozzle and creating a vortex flow around the cathode and exiting the restricted nozzle orifice.

17. The method of claim 14, wherein the method includes directing a second gas stream towards the wire feedstock free end in the form of an annular conical gas stream surrounding the wire feedstock free end and having a point of intersection spaced downstream of the wire feedstock free end.

18. The method of claim 14 wherein the surface that is coated is the inner surface of a bore.

19. The method of claim 18 wherein the bore has a diameter that is greater than or equal to about 1.3 inches.

20. The method of claim 18 wherein the bore has a diameter from about 1.3 inches to about 4.0 inches.

21. The method of claim 14 wherein the atomized molten feedstock is propelled onto the surface with an included angle defined between the plasma transferred arc and the surface that is less than 90 degrees.

* * * * *